United States Patent

[11] 3,609,756

[72] Inventors James Richard Halsall
Reading;
Alan Percy Cooper Murrell, Millbrook,
Guildford, both of England

[21] Appl. No. 825,633
[22] Filed May 19, 1969
[45] Patented Sept. 28, 1971
[73] Assignee Imperial Chemical Industries Limited
London, England
[32] Priority May 22, 1968
[33] Great Britain
[31] 24418/68

[54] DEVICES FOR PRODUCING OUTPUT SIGNALS IN DIGITAL FORM
18 Claims, 14 Drawing Figs.

[52] U.S. Cl. .......... 340/347 AD, 324/79 D
[51] Int. Cl. .......... H03k 13/02
[50] Field of Search .......... 324/79, 82; 340/170, 347; 235/92, 154

[56] References Cited

UNITED STATES PATENTS

| | | | |
|---|---|---|---|
| 2,951,202 | 8/1960 | Gordon | 235/92 X |
| 3,341,695 | 9/1967 | Vincent et al. | 235/92 X |
| 3,412,329 | 11/1968 | Granquist | 324/79 |

*Primary Examiner*—Thomas A. Robinson
*Assistant Examiner*—Charles D. Miller
*Attorney*—Cushman, Darby & Cushman

ABSTRACT: A frequency-to-digital converter for producing continuously available output signals in digital form including a pulse counter which produces an output in Gray code, a binary pulse rate multiplier coupled to the counter and a frequency comparator for receiving the input frequency signals to the converter, receiving feedback signal in pulse form form the multiplier, and supplying output signals to the first counter, the repetition rate of the feedback signals being proportional to the Gray code output of the first counter, so that the output of the first counter in Gray code forms the output of the converter in digital form.

Inventors
James Richard Halsall
Alan Percy Cooper-Murrell
By Cushman, Darby & Cushman
Attorneys Inventors
James Richard Halsall
Alan Percy Cooper Murrell
By Cushman, Darby & Cushman
Attorneys Inventors
James Richard Halsall
Alan Percy Cooper Murrell
By Cushman, Darby & Cushman
Attorneys Inventors
James Richard Halsall
Alan Percy Cooper Murrell
By Cushman, Darby & Cushman
Attorneys Inventors
James Richard Halsall
Alan Percy Cooper Murrell
By Cushman, Darby & Cushman
Attorneys Inventors
James Richard Halsall
Alan Percy Cooper Murrell
By Cushman, Darby & Cushman
Attorneys Inventors
James Richard Halsall
Alan Percy Cooper Murrell
By Cushman, Darby & Cushman
Attorneys Inventors
James Richard Halsall
Alan Percy Cooper Murrell
By Cushman, Darby & Cushman
Attorneys Inventors
James Richard Halsall
Alan Percy Cooper Murrell
By Cushman, Darby & Cushman
Attorneys Inventors
James Richard Halsall
Alan Percy Cooper-Murrell
By Cushman, Darby & Cushman
Attorneys Inventors
James Richard Halsall
Alan Percy Cooper Murrell
By Cushman, Darby & Cushman
Attorneys Inventors
James Richard Halsall
Alan Percy Cooper Murrell
By Cushman, Darby & Cushman
Attorneys

DEVICES FOR PRODUCING OUTPUT SIGNALS IN DIGITAL FORM

This invention relates to devices for producing output signals in digital form for use, for example, as data input devices in online digital computer control systems. An object of these devices is to provide continuously available nonambiguous digital data which can be interrogated at any time.

In order to provide an immediately correct response to an interrogation signal, the devices must encode the input data in a progressive code which does not pass through scattered transition states when changing in value. The simplest of such codes is the progressive binary or Gray code, which is the type used in the present invention for producing the output.

The devices of the invention also use the continuous feedback principle which is used in various known types of analogue to digital or frequency to digital converters, for example as disclosed in British Pat. No. 1,071,491 relating to a frequency meter. However, such known digital converters use pure binary or binary-decimal codes for counting purposes and therefore pass through widely scattered transition states which can cause output errors when changing in value. If the output of such known converters merely operates a visual display, as in a digital voltmeter, these short duration errors are unimportant and would probably not be noticed by the user. If however the output is to be interrogated by a computer the special precautions needed to prevent a false reading would lead to extra complexity and delay.

It is an object of the invention to avoid the above-mentioned drawback, and for this purpose the invention uses a pulse counter which operates in the progressive binary or Gray code and is therefore free from transition errors. The invention also uses a binary pulse rate multiplier which is based on a modified version of the pulse counter.

COUNTER

The electric pulse counter, used in the invention, comprises a plurality of bistable elements arranged to produce an output in Gray code and suitably connected to a plurality of Exclusive - OR logic elements for converting the Gray code output to a binary code output, means for generating a parity signal (as hereinafter defined) from the binary code output to represent the parity of the Gray code output and means for applying the parity signal to the plurality of bistable elements. Preferably the counter includes direction control means operable by a control signal for reversing the parity signal and thereby reversing the direction of counting by the counter. Conveniently, the bistable elements are in the form of flip-flops connected in cascade.

The problem of transition errors referred to earlier is avoided in the counter by the use of the Gray code in which, during the transition from any number to the next, only one bistable element changes its state in the plurality of bistable elements.

The means for reversing the parity signal may comprise a Nonequivalence or a further Exclusive - OR logic element. The Nonequivalence or the Exclusive - OR logic elements may comprise an assembly of NOT - AND or NAND gates. The flip-flops may be of the master-slave type for delaying the change in output state of the element until the initiating input pulse has terminated. Thus any input pulse is prevented from causing more than one change of state of the counter output.

The counter may be constructed so that there is no overflow in either direction if additive pulses beyond the maximum capacity are received or if subtractive pulses below zero are received. This overflow is prevented by the parity control of the gating circuits.

Alternatively, the counter may be constructed to permit overflow and, consequently, continuous counting. This feature may be achieved by including an additional bistable or flip-flop operable to transmit a signal which causes the counter to reverse operation. Thus, the counter may be arranged to add input pulses until the full state is reached then to subtract input pulses until the empty state is reached continuously. Further, if desired, the rate of filling and/or emptying may be the same or different under the control of external equipment.

The structures of the Gray code and the conventional binary code corresponding to the decimal numbers from 0 to 16 are shown in table I below, where columns $a_1$ and $a_2$ represent the least significant digits in binary and Gray code respectively:

TABLE I

| | Binary code | | | | | Gray code | | | | | Gray parity |
|---|---|---|---|---|---|---|---|---|---|---|---|
| Decimal No. | $e_1$ | $d_1$ | $c_1$ | $b_1$ | $a_1$ | $e_2$ | $d_2$ | $c_2$ | $b_2$ | $a_2$ | |
| 0 | 0 | 0 | 0 | 0 | 0 | 0 | 0 | 0 | 0 | 0 | EVEN |
| 1 | 0 | 0 | 0 | 0 | 1 | 0 | 0 | 0 | 0 | 1 | ODD |
| 2 | 0 | 0 | 0 | 1 | 0 | 0 | 0 | 0 | 1 | 1 | EVEN |
| 3 | 0 | 0 | 0 | 1 | 1 | 0 | 0 | 0 | 1 | 0 | ODD |
| 4 | 0 | 0 | 1 | 0 | 0 | 0 | 0 | 1 | 1 | 0 | EVEN |
| 5 | 0 | 0 | 1 | 0 | 1 | 0 | 0 | 1 | 1 | 1 | ODD |
| 6 | 0 | 0 | 1 | 1 | 0 | 0 | 0 | 1 | 0 | 1 | EVEN |
| 7 | 0 | 0 | 1 | 1 | 1 | 0 | 0 | 1 | 0 | 0 | ODD |
| 8 | 0 | 1 | 0 | 0 | 0 | 0 | 1 | 1 | 0 | 0 | EVEN |
| 9 | 0 | 1 | 0 | 0 | 1 | 0 | 1 | 1 | 0 | 1 | ODD |
| 10 | 0 | 1 | 0 | 1 | 0 | 0 | 1 | 1 | 1 | 1 | EVEN |
| 11 | 0 | 1 | 0 | 1 | 1 | 0 | 1 | 1 | 1 | 0 | ODD |
| 12 | 0 | 1 | 1 | 0 | 0 | 0 | 1 | 0 | 1 | 0 | EVEN |
| 13 | 0 | 1 | 1 | 0 | 1 | 0 | 1 | 0 | 1 | 1 | ODD |
| 14 | 0 | 1 | 1 | 1 | 0 | 0 | 1 | 0 | 0 | 1 | EVEN |
| 15 | 0 | 1 | 1 | 1 | 1 | 0 | 1 | 0 | 0 | 0 | ODD |
| 16 | 1 | 0 | 0 | 0 | 0 | 1 | 1 | 0 | 0 | 0 | EVEN |

The parity of a number in the Gray code is defined as whether the number in Gray code contains an odd or an even number (including zero) of ones. Thus when the parity of a number in Gray code is even, the least significant digit of the equivalent binary number is zero, and when the parity of a number in Gray code is odd, the least significant digit of the equipment binary number is one.

The parity of a number in Gray code can, therefore, be determined by translating the Gray code number into a binary number, and examining the state of the least significant binary digit. Translation from Gray code to binary code can be performed by setting the most significant binary digit to equal the most significant Gray digit, and then forming the next binary digit by adding the next Gray digit to the most significant binary digit. The new binary digit so formed is then added to the next lower Gray to form the next lower binary digit using the ordinary rules for binary addition, but ignoring carries, as shown in the following example taken from the table above for the decimal number 15:

| | | | | | | |
|---|---|---|---|---|---|---|
| | $e_2$ | $d_2$ | $c_2$ | $b_2$ | $a_2$ | |
| Gray | 0 | 1 | 0 | 0 | 0 | —Decimal 15 |
| | ↓ | + ↘ | + ↘ | + ↘ | + ↘ | |
| Binary | 0 | 1 | 1 | 1 | 1 | |
| | $e_1$ | $d_1$ | $c_1$ | $b_1$ | $a_1$ | |

In one circuit for the translation of a Gray code number into a binary number, Nonequivalence or Exclusive—OR logical elements can be used to perform the necessary addition-without-carry operations.

An examination of the Gray code numbers in the table I above, reveals that for an increasing count an even parity conditions always precedes a change in state of the least significant digit $a_2$. Conversely, for a decreasing count an odd parity condition always precedes a change in the digit $a_2$. Changes of state of all higher digits are preceded by an odd parity condition for increasing count and an even parity condition for decreasing count. Reversal of the parity signal therefore provides a means of reversing the direction of counting. The general condition for a change of state of the higher digits in Gray code is for the next lower digit to be in the "1" state and all the lesser digits to be in the "0" state.

This may be achieved using intermediate logic circuits inserted between successive flip-flop or bistable elements in order to establish a change of state.

The intermediate logic elements may comprise, for example, an assembly of NAND gates, or NOR gates. Other assemblies of logic elements may also be used providing the necessary switching conditions as referred to above are established.

MULTIPLIER

Various known binary pulse rate multipliers use binary counters which comprise a cascade of bistable elements or flip-flops with the output of each element (except the last) driving the input of the following element. The two stable states of such bistable elements or flip-flops are normally designated the '0' and '1' states where the '0' state represents the "off" condition and the '1' state represents the "on" condition. In such counters, the arrival of an input pulse will cause only one counter stage to change from 0 to 1, whereas change of state from 1 to 0 can occur in several stages simultaneously. These 0 to 1 transitions are called noncarry conditions, and the 1 to 0 transitions are called carry conditions.

If pulses are derived from the 0 to 1 transitions and, since they occur at different times, they can be combined into a single output rate without risk of coincidence. Differentiation of the output states of the binary counter can yield a positive pulse for each 0 to 1 transition and a negative pulse for each 1 to 0 transition. The negative pulses from the differentiating circuits can be suppressed and the positive pulses shaped into rectangular form and, being noncoincident, these output pulse trains can be selectively combined to provide an output pulse train whose average repetition rate is any one of various fractions of the input repetition rate.

In these known binary pulse rate multipliers, very precise techniques are needed to ensure that the pulse trains from each binary counter stage comprise pulses of equal duration and amplitude.

The present invention uses a binary pulse rate multiplier comprising a plurality of bistable elements or flip-flops arranged to operate as a progressive binary or Gray code pulse counter, and means whereby the pulses arriving at the inputs to the bistable elements are routed to a combined output pulse line via separate respective pulse rate selection gates, so that energization of appropriate ones of the selection gates creates an output pulse train in the output pulse line having an average repetition rate which is a desired fraction of the average repetition rate of the input pulses applied to the counter by way of an input pulse line.

It will, therefore, be appreciated that the pulse rate multiplier used in this invention is based on a modified version of the gated Gray code pulse counter described above.

The coupling between the bistable elements or flip-flops may be controlled by means of multiple NOT-AND or NAND gates. Alternatively, the coupling between the bistable elements or flip-flops can be controlled by logical elements providing the same logical decisions, for example, NOT-OR or NOR gates or discrete combinations of AND-OR and NOT gates. The gates from the input pulse line to the inputs of each of the bistable elements or flip-flops, except the first bistable element or flip-flop, are controlled by the states of all previous bistable elements or flip-flops.

Preferably, the bistable elements or flip-flops used are of the master-slave or J.K.-type which delay the change in output state until the initiating input pulse has terminated. Thus, any input pulse is prevented from causing more than one change of state of the counter output.

The gated method of operation of the binary pulse rate multiplier used in the present invention makes it possible, when used with a polyphase pulse generator (for example, a clock generator), to provide polyphase outputs having individual-controlled binary rates. A polyphase clock generator may be used but it is not necessary to have strict timing providing separate phases are not coincident. One clock phase drives the counter and produces output pulse trains in the same manner as in the single phase binary rate multiplier. Each additional phase is applied to a separate additional set of gates which are also controlled by the same switching signals as the gates fed directly from the outputs of the respective bistable elements or flip-flops but which are not connected to the counter pulse line. Each of these additional gates provides a further binary pulse rate output from each stage of the counter which is in phase with a respective additional phase. By providing these additional gates with one extra input terminal they can also be used as pulse rate selection gates for the appropriate phase combined output.

In a calculating apparatus, the multiplier can also be used as a divider because the division of a quantity A by a quantity B is simply the multiplication of the quantity A by the reciprocal of the quantity B.

The structures of the conventional binary code and the Gray code corresponding to the decimal numbers from 0 to 16 have been shown in table I above.

The Gray code is a progressive code in which only one element changes state for each increment, therefore all transitions are noncoincident. As mentioned above, the general condition for a change of state of the higher digits in the Gray code is the next lower digit to be in the "1" state and all the lesser digits to be in the "0" state. By gating a pulse to the appropriate output each time an element changes either from 0 to 1 or from 1 to 0, a count of 0 to 15 will yield eight output pulses in column $a_2$, four in column $b_2$, two in column $c_2$ and one in column $d_2$. The pulses to be gated are those input pulses which cause the element to change state.

Also, as seen from the table I, for a count from 0 to 15, eight "noncarry" conditions occur in column $a_1$, four in column $b_1$, two in column $c_1$, and one in column $d_1$. Thus, the binary rated pulses obtained in the Gray code counter occur at the same intervals as those derived as a result of 0 to 1 transitions in various known binary pulse rate multipliers.

CONVERTER

According to one aspect of this invention, a device for producing continuously available output signals in digital form comprises:

a. a first pulse counter which comprises a plurality of bistable elements arranged to produce an output in Gray code and suitably connected to a plurality of Exclusive—OR logic elements for converting the Gray code output to a binary code output, means for generating a parity signal (as hereinbefore defined) from the binary code output to represent the parity of the Gray code output, and means for applying the parity signal to the plurality of bistable elements;

b. a binary pulse rate multiplier, directly coupled to the first counter, which comprises a plurality of further bistable elements arranged to operate as a second Gray code pulse counter, and means whereby the pulses arriving at the inputs to the further bistable elements are routed to a combined output pulse line via separate respective pulse rate selection gates, so that energization of appropriate ones of the selection gates creates an output pulse train in the output pulse line having an average repetition rate which is a desired fraction of the average repetition rate of the input pulses applied to the second counter by way of an input pulse line;

c. a frequency comparator for receiving the input frequency signals to the converter, receiving feedback signals in pulse form from the multiplier, and supplying output signals to the first counter, the repetition rate of the feedback signals being proportional to the Gray code output of the first counter, so that the output of the first counter in Gray code forms the output of the converter in digital form.

The input frequency signal may be compared with two or more feedback frequency signals in the comparator so as to produce a continuously available output frequency signal from the comparator of a predetermined range from zero to a maximum value for supply to the first counter, and the output frequency signal from the comparator corresponding to zero indicated output at the first counter has a finite value.

The second or subsequent feedback frequency or frequencies may be derived from the multiplier of a polyphase type or may be received from an external source.

The first counter and/or the multiplier may include various other features as described above.

According to another aspect of the invention, a digital computer control system includes one or more of the frequency converters as nonsynchronous data input devices for the system.

Preferably, the circuit elements used in the construction of the binary rate multiplier consist of resistors, semiconducting diodes and transistors.

Specific embodiments of the invention will now be described, by way of example, with reference to the accompanying diagrammatic drawings, in which similar parts are indicated by similar references, and in which.

Figure 1:
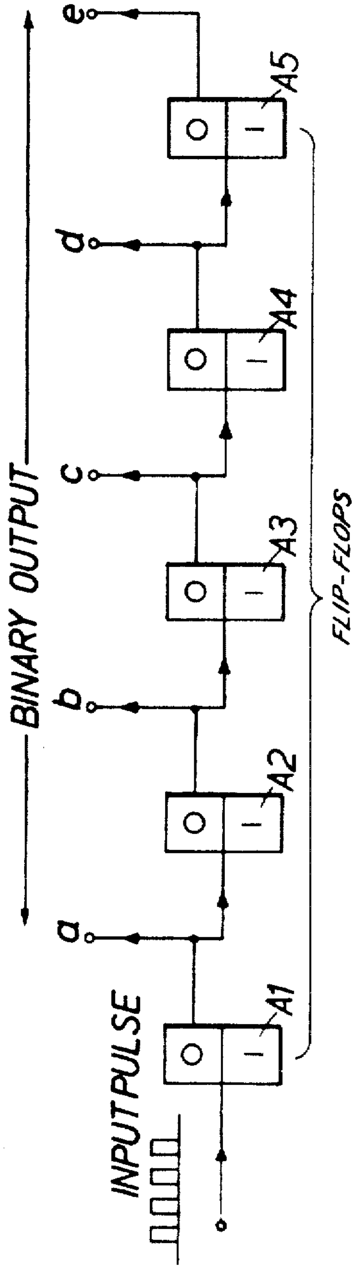
FIG. 1 illustrates a simple type of known counter for counting in the binary code; a FIG. 2 illustrates the logical diagram of A seven-stage version of the counter used in the present invention.
Figures 3, 4:
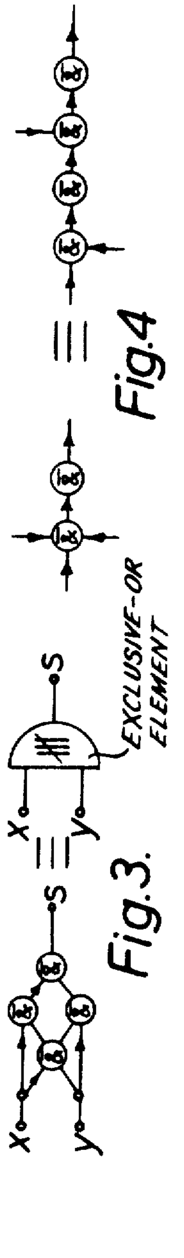
FIGS. 3 and 4 show alternative logic circuits.

Referring to FIG. 1, there is illustrated a known ripple counter having a cascade of five bistable elements A1,2,3,4,5, or flip-flops, with the binary output of the five elements available at the terminals *a* to *e* respectively, and the output of each element (except the last) driving the input of the following element. In the cascade of the bistable elements output *a* represents the least significant and *e* the most significant digit. The states of the flip- flops represent the binary number equivalent of the total number of pulses fed into the counter. Each additional pulse entering the counter must change the states of as many of the flip-flops as is necessary to set up the new binary number equivalent. Thus, if 15 pulses are stored in the counter and a 16th pulse is received, the states of the counter must change from binary 01111 (decimal 15) to binary 10,000 (decimal 16). In this example where five flip-flop elements must change state in sequence before the required stable state of the counter is reached, the counter will pass through certain binary states between 00000 and 10,000 during the transition period. Serious errors would therefore arise if the counter were to be interrogated during such a transition period.

Figure 2:
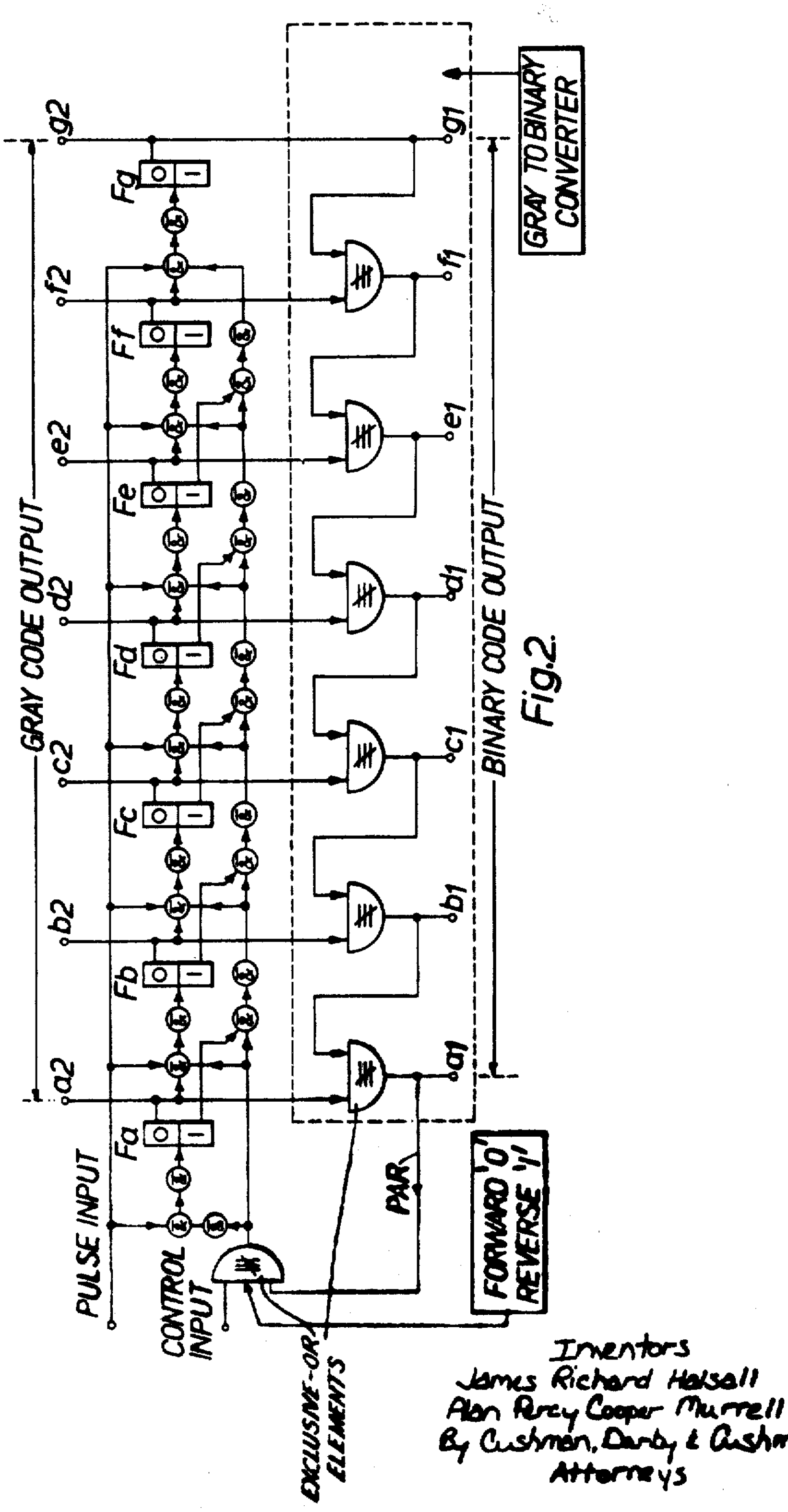

In FIG. 2, seven bistable elements or flip-flops $F_a$ to $F_g$ are coupled through multiple (not—AND) or NAND gates $\bar{4}$. Each NAND gate $\bar{4}$ provides a logical output of "0" when all its inputs are "1," and a logical output of "1" under any other set of input conditions. Each bistable element $F_a$ to $F_g$ and its associated NAND gate $\bar{4}$ forms a stage of the counter and each stage, except the first and last, is identical so that the counter can be extended to afford any desired number of stages.

The bistable elements $F_a$ to $F_g$ produce outputs at the respective terminals $a_2$ to $g_2$ in a progressive binary or Gray code. The output in Gray code is converted into a binary output at terminals $a_1$ to $g_1$ by means of respective nonequivalence or exclusive—or logical elements $\not\equiv$. Each nonequivalence element $\not\equiv$ has input terminals *x* and *y* and an output terminal S (see inset drawing in FIG. 2), and may be assembled from a plurality of NAND gates $\bar{4}$.

From the least significant digit of the binary code output, a parity signal for the Gray code output is obtained (as hereinbefore described) and is fed to one input terminal of a further Nonequivalence element $\not\equiv$. A control signal is fed to the other input terminal of this further Nonequivalence element $\not\equiv$, and the output of this further element $\not\equiv$ is fed to the flip-flop elements $F_a$ to $F_g$. The output of the further element $\not\equiv$ may be reversed by means of the control signal fed thereto, which controls the direction of counting by the counter.

The first stage, including the bistable element $F_a$, is controlled by the parity state and the pulse input only. Higher stages, including the bistable elements $F_b$ to $F_g$ respectively, are each controlled by the parity state, the pulse input, and the state of all the preceding stages.

Additive pulses beyond the maximum capacity of the counter or subtractive pulses below zero are inhibited by the parity control of the gating circuits to prevent overflow in either direction.

The bistable elements $F_a$ to $F_g$ are of the master-slave or J.K.-type which delay the change in their output state until the initiating input has terminated, thereby preventing any input pulse from causing more than one change in state of the counter.

Figure 5:
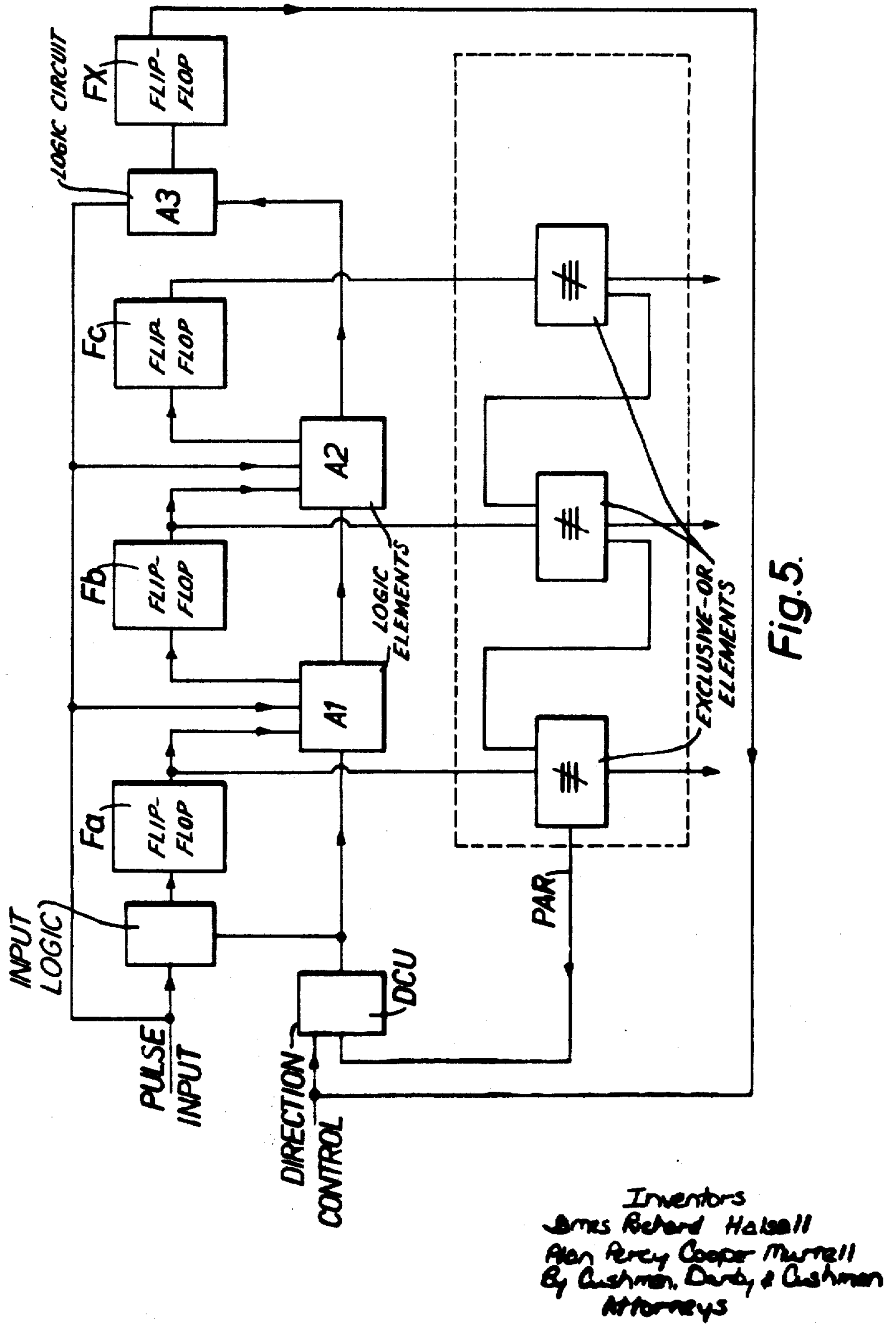
FIG. 5 shows a counter permitting overflow.

FIG. 5 shows a schematic wiring diagram of a counter used in this invention and modified so as to permit overflow. In this Figure three bistable or flip-flops $F_a$, $F_b$ and $F_c$, intermediate logic elements represented by A1 and A2 and Gray/binary logic elements $\not\equiv$ similar to those used in FIG. 1 are indicated. To permit overflow, the circuit of FIG. 5 differs from that of FIG. 1 in that an additional intermediate logic circuit A3 and an additional bistable FX are coupled in circuit as shown. The output of the bistable FX and the parity line signal PAR are fed into a direction control unit DCU.

Figure 6:
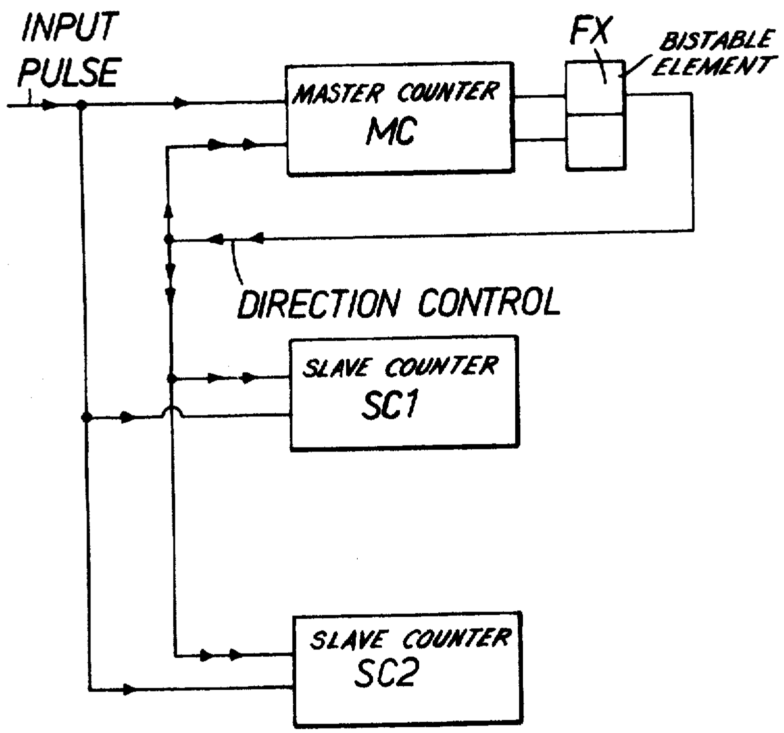
FIG. 6 shows a counter capable of synchronization.

FIG. 6 shows a schematic diagram of a master counter MC and two slave counters SC1 and SC2. The master counter MC includes an additional bistable/intermediate logic arrangement FX discussed in connection with FIG. 5 whereas the slave counters are constructed in the same way as that shown in FIG. 2. The direction control signal from FX is fed to MC SC1 and SC2 which are connected in parallel and also receive pulses from the input pulse line.

Such a system will cause all the counters MC SC1 and SC2) to be in synchronism when the additional bistable FX on the master counter MC has generated a second reversal or in other words the direction control signal has changed state.

A system as described in connection with FIG. 6 may be used in serial telemetering and may form the basis of a serialized scanning device for transmitting signals over a single line and extracting the signals as and when required.

The circuitry of the counters described above may be constructed using microelectric integrated circuit elements in the form of modules.

The counter of FIG. 1 can be used in a binary rate multiplier which accepts an input pulse train of a certain repetition rate and divides the input pulses by binary factors 2, 4, 8, 16 etc., to supply separate noncoincident pulse trains whose repetition rates are related in binary ratio. Because these output pulse trains are noncoincident they can be selectively combined to give an output pulse train whose average repetition rate is any one of various fractions of the input. For example, with an input rate of *x* pulses per second the outputs representing $x/2$ and $x/8$ pulses per second could be selected to form a composite output rate of $(5/8)x$ pulses per second. This is the logical equivalent of multiplying *x* by the binary number 0.1010., hence the use of the device as a multiplier.

Figure 7:
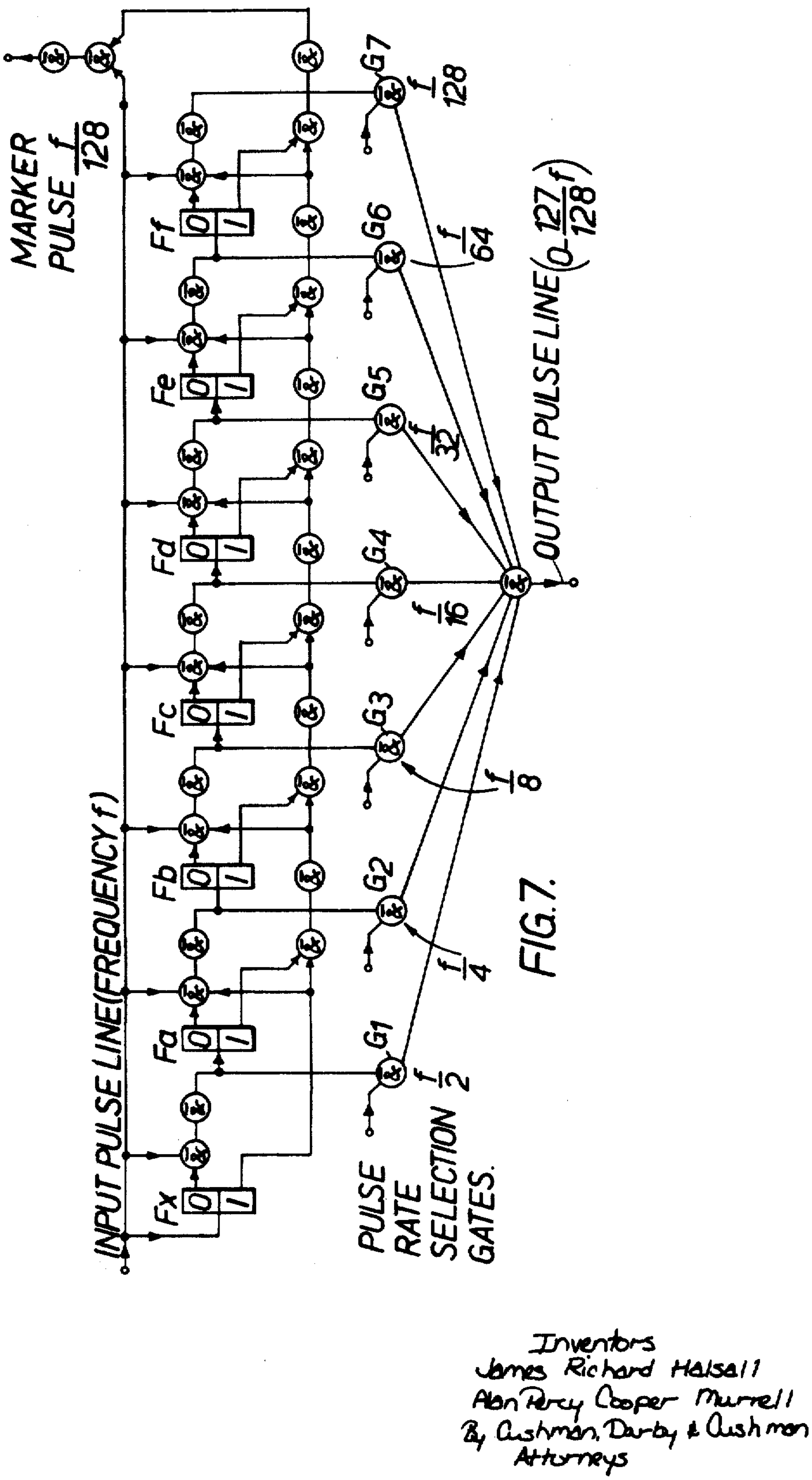
FIG. 7 illustrates the logical diagram of a seven-stage version of a binary pulse rate multiplier for single-phase pulses, used in the present invention.

Referring to FIG. 7, each stage of the seven-stage multiplier is identical, except the first and the last stages, and the multiplier can be extended to produce any desired number of stages. Coupling between the seven flip-flop stages *Fx*, *Fa*, *Fb*, *Fc*, *Fd*, *Fe* and *Ff* is controlled by means of multiple NOT- AND or NAND gates $\bar{\&}$. Each NAND gate $\bar{\&}$ supplies a logical output of '0' when all its inputs are set to a '1' and a logical output of '1' under any other set of input conditions.

All input pulses, having an average frequency $f$, are applied to the flip-flop $Fx$ which therefore reverses state at the termination of each pulse. The gates from the input pulse line to the input of flip-flop $Fa$ are controlled by the state of the flip-flop $Fx$, which allows alternate input pulses to be applied to flip-flop $Fa$. The gates $\bar{\&}$ from the input pulse line to the inputs of all other flip-flops $Fb$ to $Ff$ are controlled by the states of all previous flip-flops, and are arranged so that the flip-flops $Fa$, $Fb$, $Fc$, etc., operate as a Gray code counter. Hence, one out of every four pulses is applied to the input of $Fb$, one out of every eight pulses to the input of $Fc$, the number of input pulses decreasing in binary ratio for each successive flip-flop.

The pulses arriving at the inputs to the Gray code counter flip-flops $Fa$, $Fb$, $Fc$ etc. are also routed to the combined output pulse line via individual pulse rate selection gates G1 to G7. By energizing the appropriate pulse rate selection gates G1 to G7, an output pulse train whose average repetition rate is any one of various fractions (0 to 127/128) of the input can be obtained.

When fed with a continuous train of input pulses the counter operates as though it formed the initial stages of an infinitely long counter. The seven-stage counter illustrated in FIG. 7 can deliver a maximum of 127 output pulses to the output pulse line for every 128 pulses applied to the input pulse line. Thus, the maximum output to input pulse ratio is 127/128 corresponding to the sum of the series $\frac{1}{2}+\frac{1}{4}+\frac{1}{8}+1/16+1/32+1/64+1/128$. One out of every 128 input pulses would be passed on to operate the additional stages if the counter were extended in length. The inclusion of suitable gating at the end of the counter permits these pulses to be collected to produce a marker pulse at the end of each complete pattern of 0 to 127 output pulses.

Figure 8:
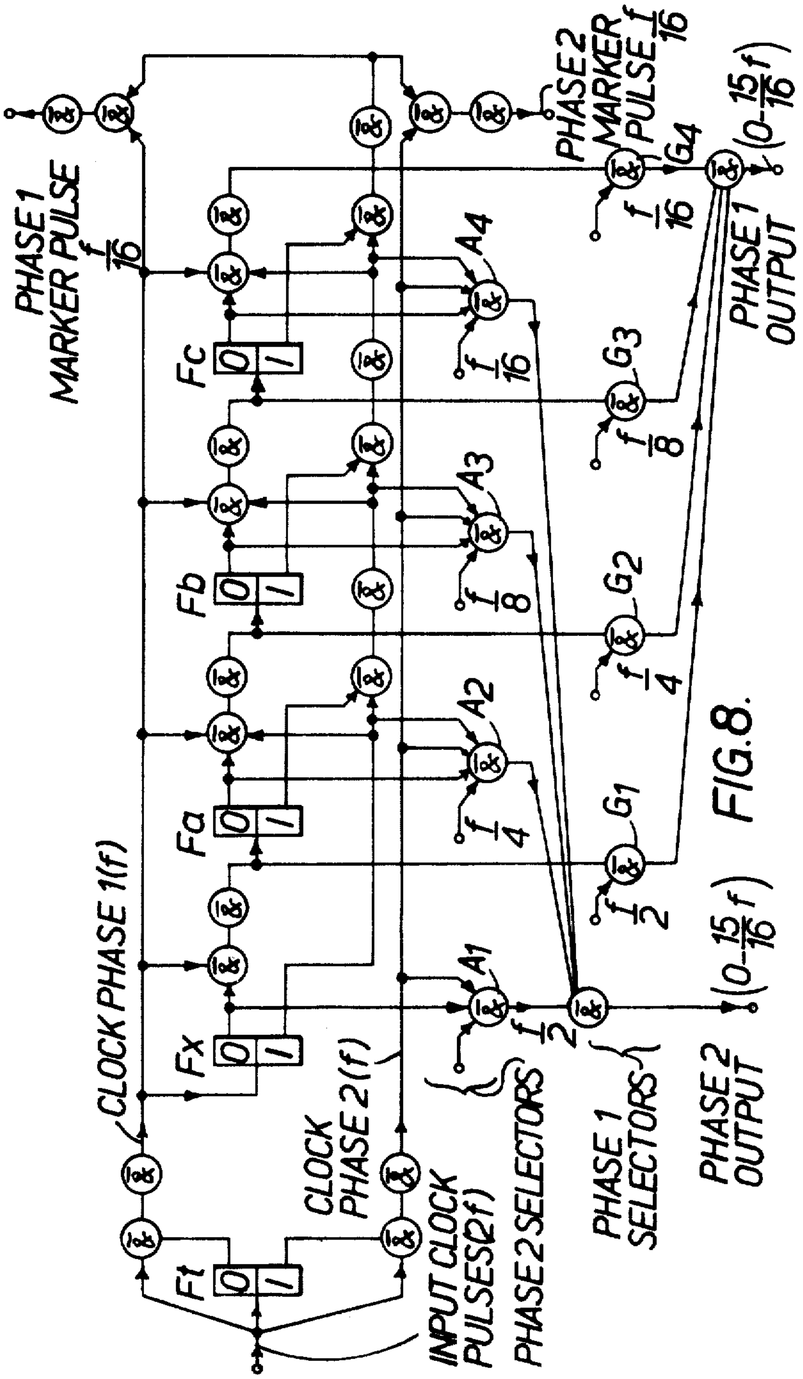
FIG. 8 illustrates the logical diagram of a four-stage version of a binary pulse rate multiplier for two-phase pulses, used in the present invention.

Referring to FIG. 8, the input two-phase clock pulses applied to flip-flop $Ft$ cause it to reverse state at the end of each pulse, and by means of the gates $\bar{\&}$ controlled by its output states, alternative interlaced pulses are directed to the two separate clock-phase lines.

One clock phase (phase 1) drives the counter and produces output pulse trains, via pulse rate selection gates $G_1$, $G_2$, $G_3$ and $G_4$, in the same manner as the single phase binary multiplier described with reference to FIG. 7. The second clock phase (phase 2) is applied to an additional set of gates $A_1$, $A_2$, $A_3$ and $A_4$, which are also controlled by the same static-switching signals as the gates fed directly from the flip-flops $Fx$, $Fa$, $Fb$ and $Fc$, but which are not connected to the counter pulse line. These additional gates $A_1$, $A_2$, $A_3$ and $A_4$ produce a second binary pulse rate output from each stage of the binary rate multiplier which is in phase with the second clock phase. By providing these additional gates $A_1$, $A_2$, $A_3$, $A_4$ with one extra input terminal they can also be used as pulse rate selection gates for the second phase combined output as shown in FIG. 8.

The arrangement of FIG. 8 can readily be extended to provide any desired number of output phases having individually controlled binary rates. For example, the two separate clock phases in FIG. 8 could each be split into two, to provide four separate phases, and the counter could control three external sets of gates to provide a total of four individually controlled binary rates. Since these outputs are derived from different phases of the same clock pulse generator (not shown), the pulses cannot be coincident and these outputs can, if desired, be combined.

Figure 9:
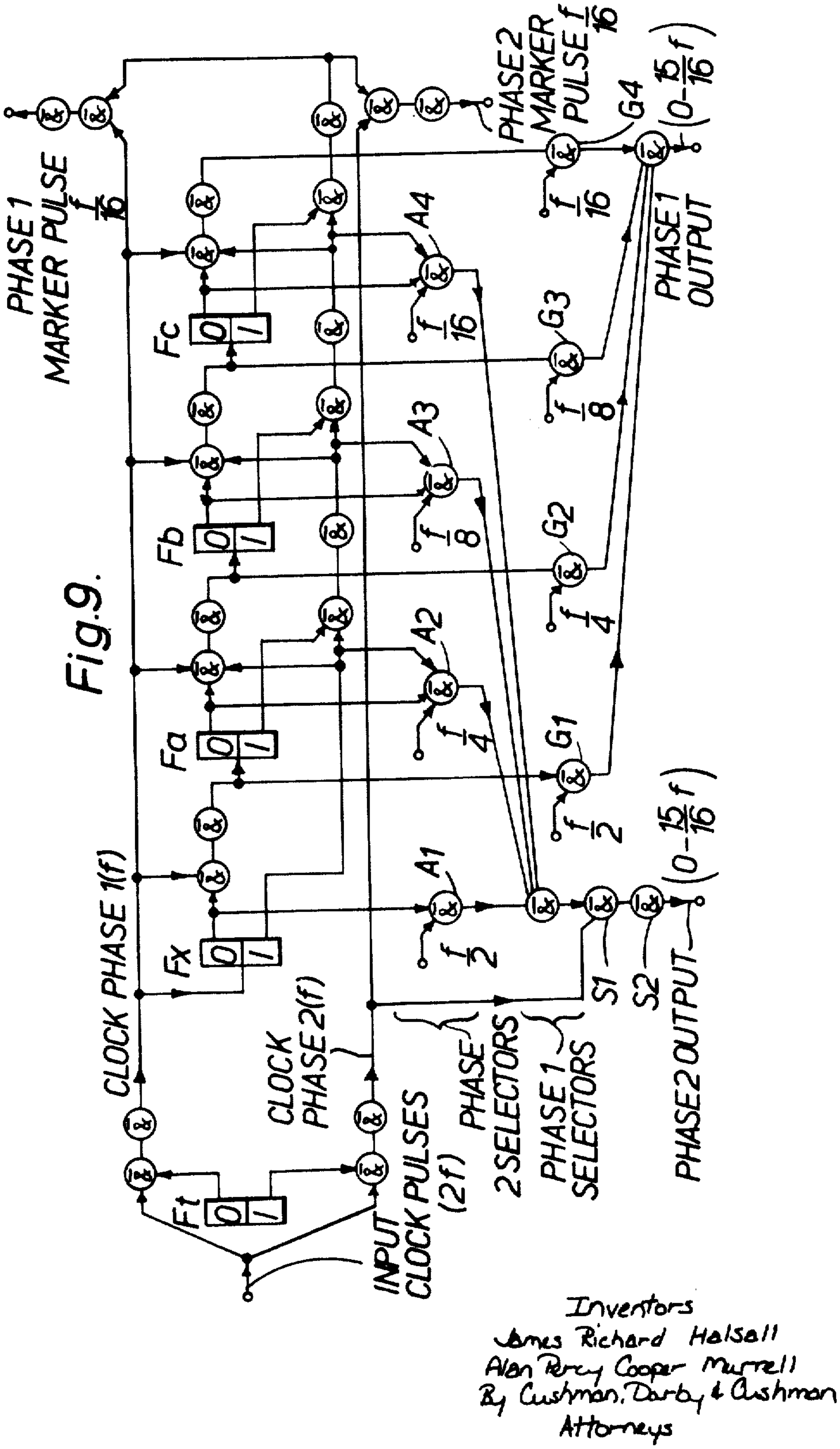
FIG. 9 illustrates a modification of the multiplier of FIG. 8.

Referring to FIG. 9, which illustrates a modification of the arrangement of FIG. 8, the second clock phase is not applied to the additional NAND gates $A_1$, $A_2$, $A_3$ and $A_4$, but is directed to two further NAND gates $S_1$ and $S_2$. The gates $A_1$, $A_2$, $A_3$ and $A_4$ are controlled by the same static-switching signals as the gates which are fed directly by the flip-flops $Fx$, $Fa$, $Fb$ and $Fc$. The pulse rate selection signals for the second phase are applied to the gates $A_1$, $A_2$, $A_3$ and $A_4$, and outputs of the gates $A_1$, $A_2$, $A_3$ and $A_4$ are combined as static logic signals. The second clock phase signal is then added by the gates $S_1$ and $S_2$ to the combined static logic signals from the gates $A_1$, $A_2$, $A_3$ and $A_4$.

In the arrangement of FIG. 9, the gates $A_1$, $A_2$, $A_3$ and $A_4$ can be made as three-position NAND gates instead of four-position NAND gates, thereby reducing the cost of the multiplier. The arrangement of FIG 9 can also be extended to any desired number of phases.

Figure 10:
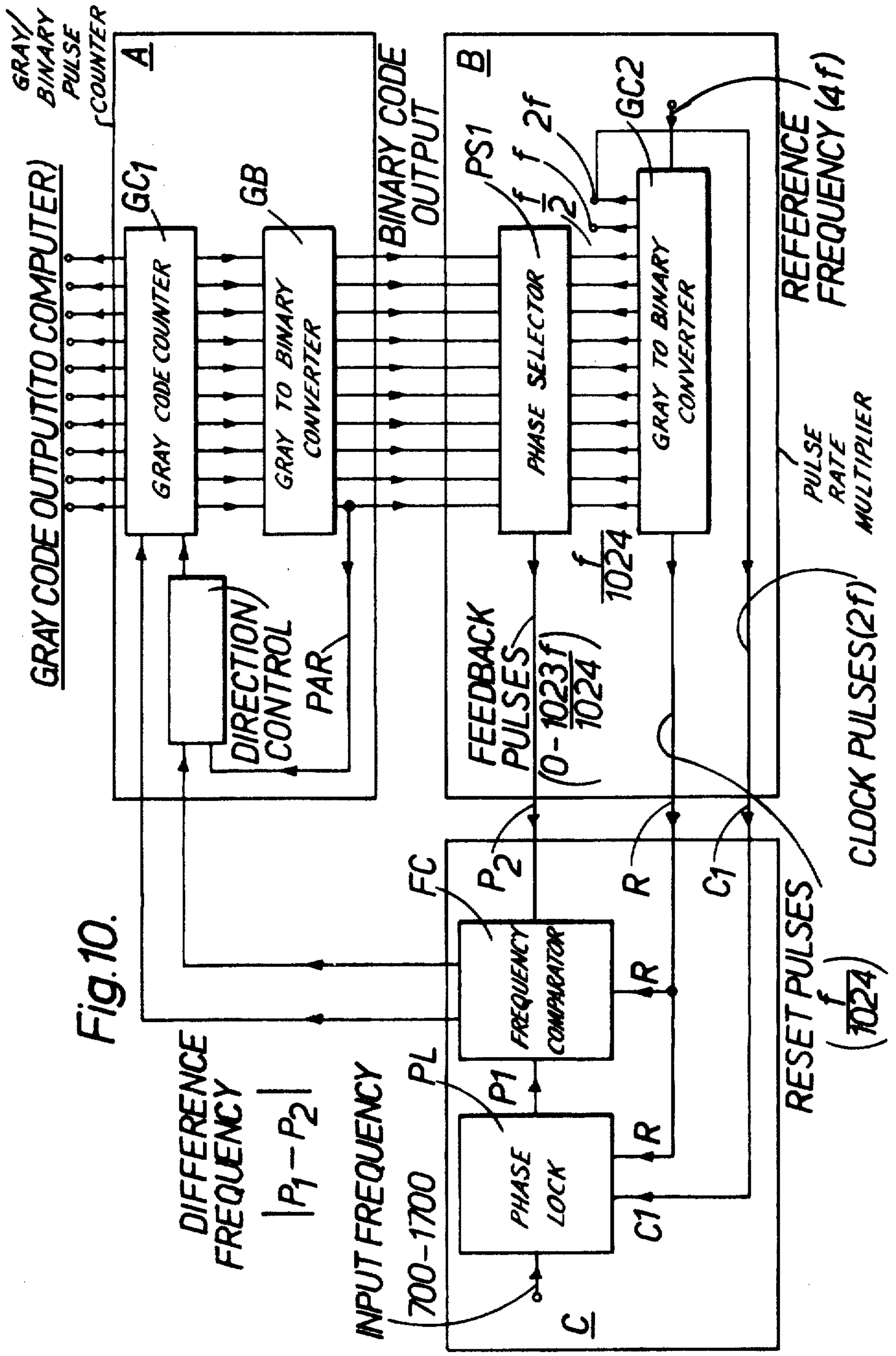
FIG. 10 illustrates a frequency to digital converter according to the present invention.

Referring to FIG. 10, an input frequency is supplied, in the frequency to digital converter, as one input to a phase lock PL from which the output $P_1$ is supplied as one input to a frequency comparator and digital filter FC. A binary pulse rate multiplier B provides feedback pulses $P_2$ and reset pulses R as further inputs to the frequency comparator and digital filter FC, and provides the reset pulses R and clock pulses $C_1$ as further inputs to the phase lock PL.

A reversible Gray/binary pulse counter A (described with reference to FIGS. 2 to 6) and a binary pulse rate multiplier B (described with reference to FIGS. 7 to 9) are directly coupled together so that the feedback frequency $P_2$ is always proportional to the encoded output from the counter A. The counter A is shown as having a Gray code counter portion GC1 and a Gray to Binary converter portion GB. The multiplier B is shown as having a Gray code counter/pulse generator portion GC2.

Figure 12:
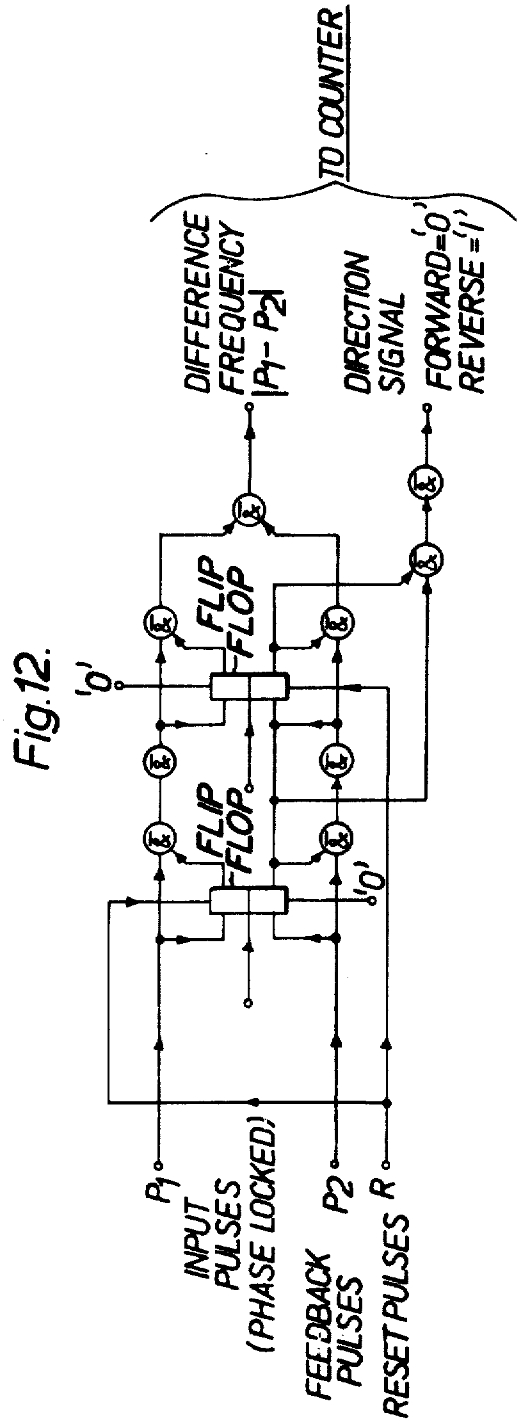
FIG. 12 illustrates a frequency comparator and digital filter used in the converter of FIG. 10.

The frequency comparator FC (shown in more detail in FIG. 12) produces as outputs a difference frequency ($P_1-P_2$) and a direction signal '0' or '1' for the forward or reverse operation respectively of the counter A.

Figure 11:
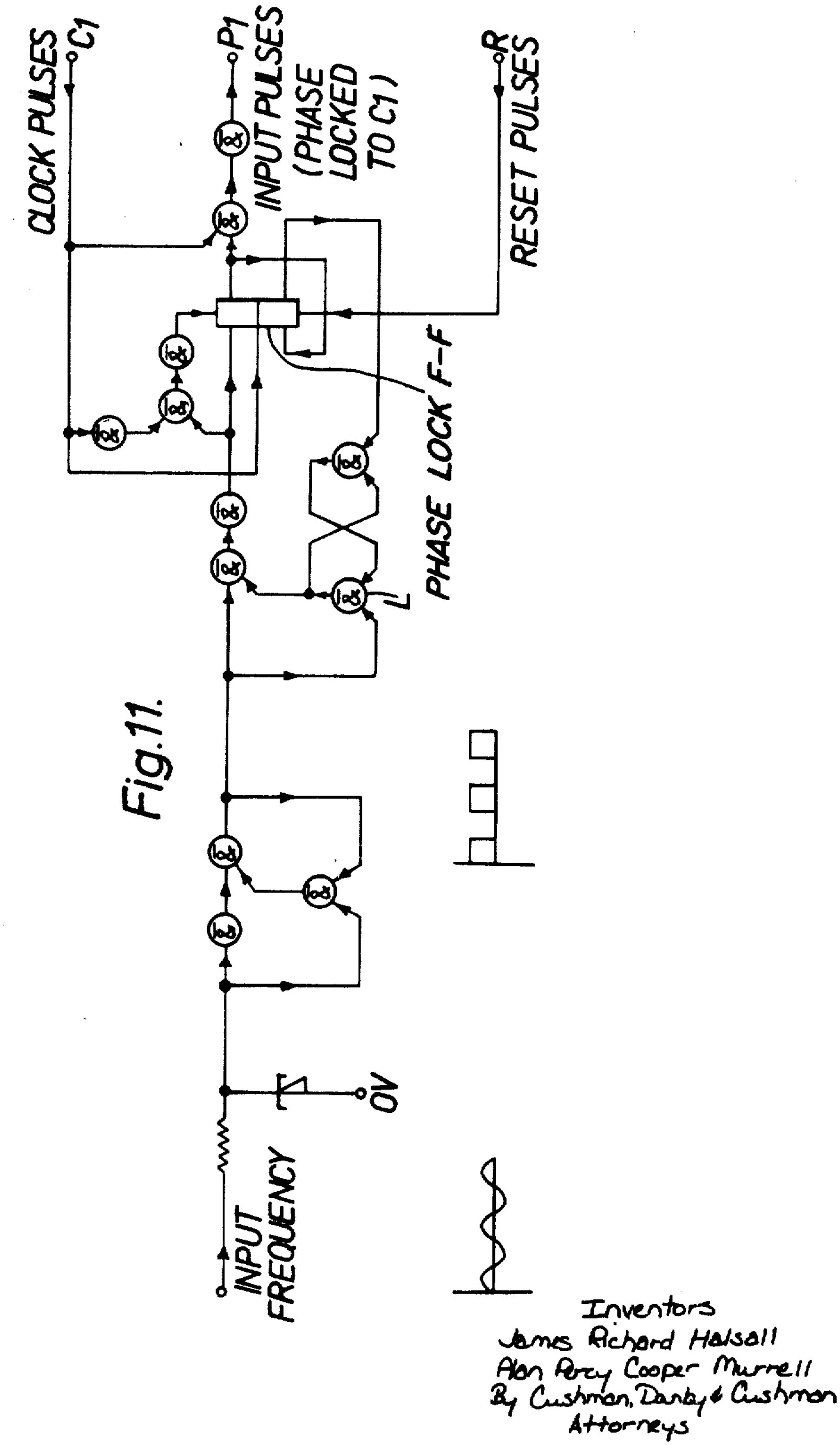
FIG. 11 illustrates a frequency meter phase lock used in the converter of FIG. 10.

The phase lock unit PL (shown in more detail in FIG. 11) is used to prevent coincidence between the arrival of input and feedback pulses at the frequency comparator FC. This phase lock is controlled by the clock pulses $C_1$ derived from the binary rate multiplier B at a frequency $2f$ which is twice as great as the highest input frequency. Input pulses arriving at the phase lock PL in the absence of a pulse $C_1$ are immediately stored in the phase lock flip-flop (see FIG. 11). Input pulses arriving while a pulse $C_1$ is present are stored at the termination of that pulse $C_1$. Stored pulses $C_1$ are released by the next pulse $C_1$. A latch L is provided in the phase lock PL to prevent a long duration input pulse from producing more than one output pulse.

At least two successive pulses are required on the same input line $P_1$ or $P_2$ to the frequency comparator FC, and none on the other input line, to produce an output pulse ($P_1-P_2$) to feed the counter A Pulses arriving at the same rate alternately at the two inputs $P_1$ and $P_2$ of the frequency comparator FC are therefore cancelled and do not cause the counter A to jitter up and down.

The feedback pulses from the binary rate multiplier B will, for most frequencies, consist of a train of unevenly spaced pulses $P_2$ having the desired repetition rate when averaged over a complete cycle of the binary rate multiplier B. Since two successive pulses $P_1$ or $P_2$ are needed at the frequency comparator FC to produce an output ($P_1-P_2$) no jitter is produced in the counter A even when the uneven spacing of the pulses $P_2$ is due to the absence of single pulses in the feedback pulse train. Jitter caused in the counter A by the absence of two or more successive pulses $P_2$ can be eliminated by adding extra stages to the input of the frequency comparator FC to provide additional digital filtering. However, since the jitter in the counter A is normally confined to the last significant bit, it is relatively unimportant for computer interrogation, and the additional filtering would only be justified if a visual display was also required.

The Gray code counter A and the binary rate multiplier B can only be adjusted in steps corresponding to one least significant bit, but the input frequency to the converter may vary continuously. An intermediate value of the input frequency could therefore cause the counter A to alternate between two definite values above and below the actual value of the input frequency unless the value is "rounded-off." This rounding-off process is accomplished by means of a reset pulse R generated at the end of each complete cycle of the binary rate multiplier B, which is used to reset the phase lock PL and the frequency comparator FC to the same initial conditions. Intermediate frequencies are therefore stored in the counter as definite values below the actual value.

The phase lock PL and the frequency comparator FC together form the frequency input unit C.

If used in combination the rounding-off process and the digital filtering result in a single bit error confined to the bottom end of the scale, which in no way affects the accuracy elsewhere. This error arises because when a single bit is stored in the counter A, the binary rate multiplier B can only supply a single feedback pulse to the digital filter before it is reset. This single pulse is insufficient to produce an output from the frequency comparator FC and the counter cannot therefore return to zero, and is restricted to a minimum value of one bit. Since most transducers giving a frequency output signal, such as turbine flowmeters, do not operate down to zero frequency this restriction is usually of no consequence.

Figure 13:
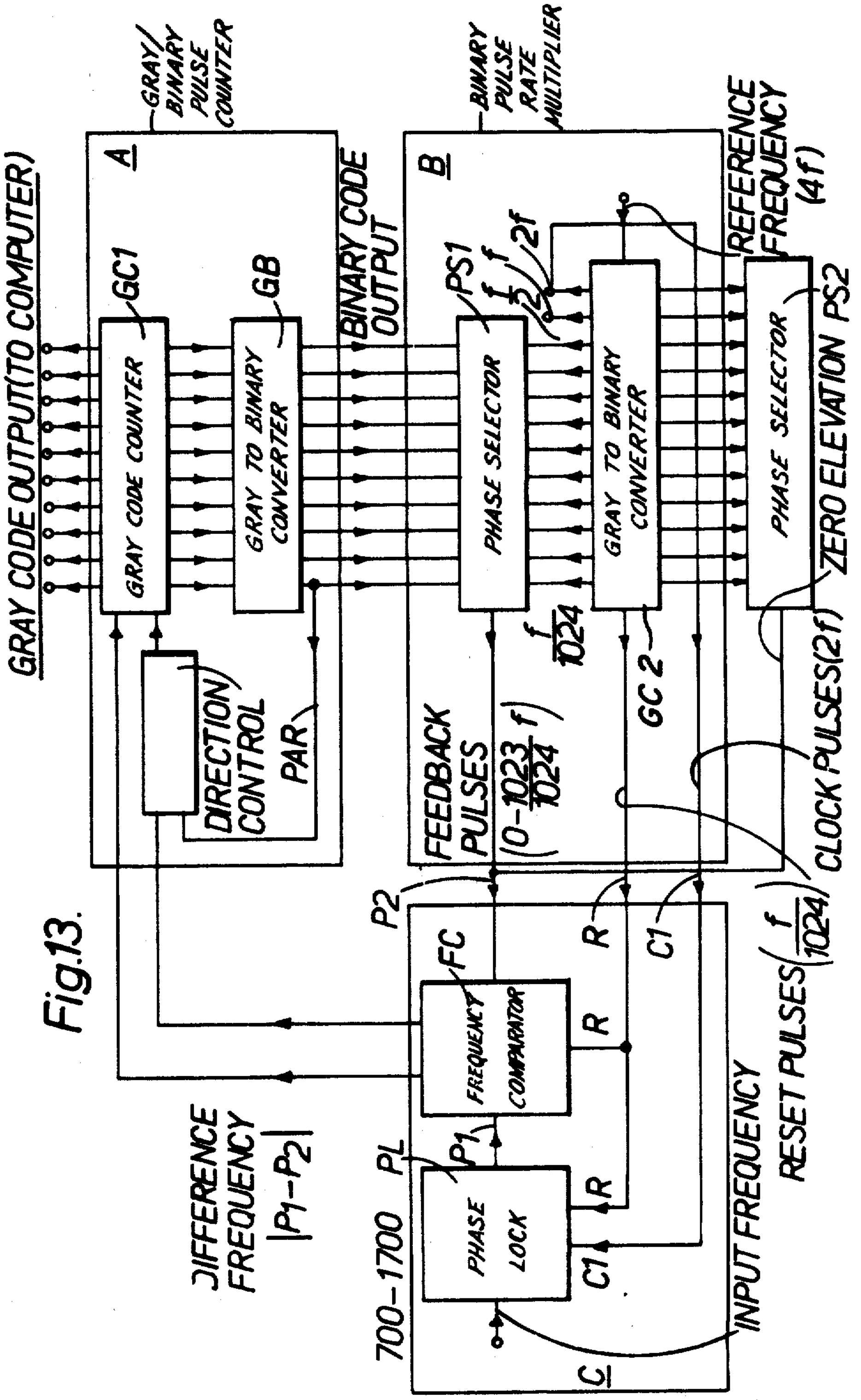
FIG. 13 illustrates a modification of the converter of FIG. 10, for a two-phase input.

FIG. 13 illustrates a frequency to digital converter for a two-phase input, and is a modification of the arrangement shown in FIG. 10. Separate sets of pulse rate selection and combining gates PS1 and PS2 are provided in the binary pulse rate multiplier B for the two phases, and signals from both these sets of gates PS1 and PS2 are fed as inputs to the frequency comparator and digital filter FC. The two-phase binary pulse rate multiplier has been described in more detail with reference to the FIGS. 7 to 9, and can be extended to any desired number of phases.

The arrangement of FIG. 13 can also be used to calibrate or set a zero scale of the Gray code output to a computer. To this end, the frequency meter of the multiplier B can be constructed to accept elevated zero signals of, for example, a frequency range from 5,000 to 6,000 cycles, and to provide a corresponding Gray code output of say zero to 1,000 full scale. This is achieved by the use of the polyphase facility offered by the second and subsequent phases available from the binary pulse rate multiplier B. In other words, a zero elevation or datum signal (a noncoincident signal) is fed from the second or subsequent phases of the polyphase facility into the feedback pulse line of the first or master phase, from the appropriate pulse rate selection and combining gates, as an input to the frequency comparator and digital filter.

The converter of FIGS. 10 to 13 can be adapted to convert analogue voltage signals into digital signals by first converting the analogue voltage signals to frequency signals by known means, and then converting the frequency signals to digital signals by the converter of FIGS. 10 to 13.

Figure 14:
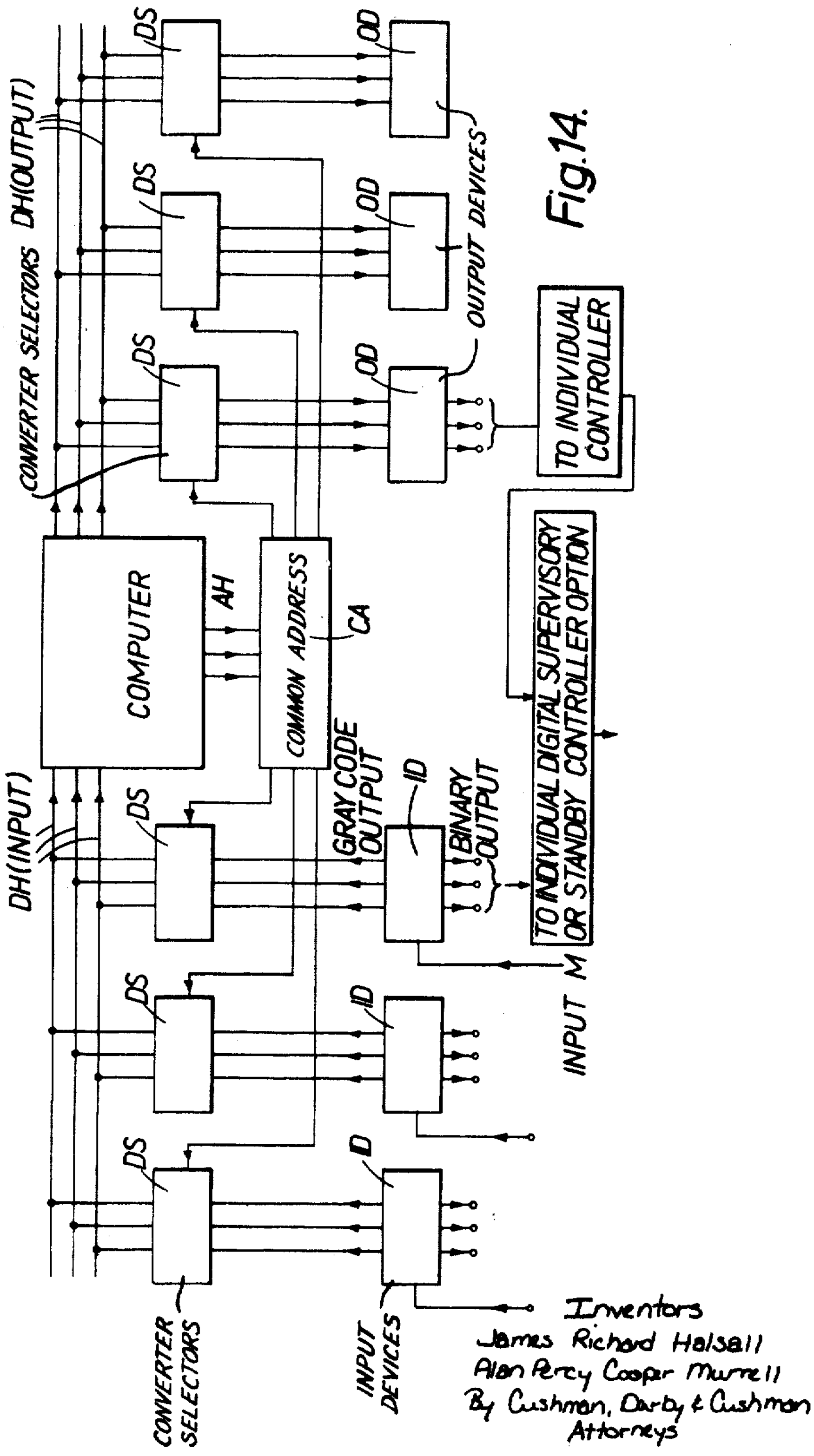
FIG. 14 illustrates a digital computer highway system using the present invention.

The converter described with reference to FIGS. 10 to 13 can be used, as shown in FIG. 14, to convert various measured variables M into Gray coded parallel digital signals. Such converters can be connected in parallel through switching logic gates to a common address CA and data highways DH (input and output) of a computer. The switching logic gates form the converter selectors DS and will connect the output of the appropriate input or output device ID/OD to the data highway on receipt of an address on the address highway as shown in the FIG. 14.

The computer can therefore interrogate any of these converters on demand by generating the appropriate address transmitted along address highway AH in the same way that internal computer store locations are addressed and interrogated.

This method of coupling the computer to the plant by means of nonsynchronous data input devices, overcomes the inherent synchronization problems of conventional techniques and provides a flexible installation technique, and simplifies both the hardware and programming requirements.

We claim:

1. A frequency to digital converter for producing continuously available output signals in digital form comprising:

a. a first pulse counter which comprises a plurality of bistable elements arranged to produce an output in Gray code and suitably connected to a plurality of Exclusive-OR logic elements for converting the Gray code output to a binary code output, means for generating a parity signal from the binary code output to represent the parity of the Gray code output, and means for applying the parity signal to the plurality of bistable elements;

b. a binary pulse rate multiplier, directly coupled to the first counter, which comprises a plurality of further bistable elements arranged to operate as a second Gray code pulse counter, and means whereby the pulses arriving at the inputs to the further bistable elements are routed to a combined output pulse line via separate respective pulse rate selection gates, so that energization of appropriate ones of the selection gates creates an output pulse train in the output pulse line having an average repetition rate which is a desired fraction of the average repetition rate of the input pulses applied to the second counter by way of an input pulse line;

c. a frequency comparator for receiving the input frequency signals to the converter, receiving feedback signals in pulse form from the multiplier, and supplying output signals to the first counter, the repetition rate of the feedback signals being proportional to the Gray code output of the first counter, so that the output of the first counter in Gray code forms the output of the converter in digital form.

2. A converter according to claim 1, wherein the input frequency signal is compared with a plurality of feedback frequency signals in the comparator so as to produce a continuously available output frequency signal from the comparator of a predetermined range from zero to a maximum value for supply to the first counter, and the output frequency signal from the comparator corresponding to zero indicated output at the first counter has a finite value.

3. A converter according to claim 2, wherein said plurality of feedback frequencies are derived from the multiplier of a polyphase type.

4. A converter according to claim 2, wherein said plurality of feedback frequencies are derived from an external source.

5. A converter according to claim 1, wherein the bistable elements in each said counter are respectively connected in cascade.

6. A converter according to claim 5, wherein each said counter comprises a plurality of stages, each stage including a said bistable element and interconnected with the next stage through an intermediate logic circuit, each intermediate logic circuit being connected in circuit with a common pulse line and with each other through a direction control line.

7. A converter according to claim 6, wherein each said intermediate logic circuit produces a logical output of "0" when all its inputs are "1" and a logical output of "1" under any other input condition.

8. A converter according to claim 1, wherein the bistable elements of said counters are arranged in stages and wherein the second and up to and including the penultimate stages in each said counter are identical so that the number of stages can be extended.

9. A converter according to claim 9, wherein the bistable element in the first stage of the first counter is controlled by the parity state and the input pulse and wherein the second and higher stages are each controlled by the parity state, the pulse input and the state of all the preceding stages.

10. A converter according to claim 1, wherein the bistable elements in each said counter are of the master-slave type which delay a change in the output stage until termination of the initiating input thereby preventing any input causing more than one change in the state of the counter.

11. A converter according to claim 11, wherein additive pulses beyond a maximum number of subtractive pulses below zero are inhibited by parity control of gating circuits in the first counter thereby preventing overflow in either direction.

12. A converter according to claim 11, wherein overflow and continuous counting is permitted in the first counter which includes an additional bistable element operable to transmit a signal which causes the first counter to reverse operation.

13. A converter according to claim 13, wherein the additional bistable element in the first counter is connected in circuit with an additional intermediate logic circuit which receives input signals from the common pulse line and the intermediate logic circuit of the previous stage and wherein the output of the additional bistable is a direction control signal connected to the direction control line through a direction control unit which also receives the parity signal from the binary code output.

14. A converter according to claim 14, wherein the first counter is connected in circuit with at least one additional counter, and the direction control signal from the additional bistable of the first counter is fed to the said additional counter which is connected in parallel and which receives signals from the input pulse line, whereby the first counter and the additional counter will be in synchronism on and after the first counter has generated a second reversal.

15. A converter according to claim 1, wherein the gates from the input pulse line to the inputs of each of the bistable elements of the second counter, except the first bistable element or flip-flop, are controlled by the states of all previous bistable elements of the second counter.

6. A converter according to claim 1, wherein the multiplier is fed by a polyphase clock pulse generator, and wherein one clock phase drives the second counter and produces output pulse trains in the same manner as in the single phase binary rate multiplier, and each additional clock phase is applied to a separate additional set of gates which are also controlled by the same switching signals as the gates fed directly from the outputs of the respective bistable elements but which are not connected to the counter pulse line, so that each of the additional gates provides a further binary pulse rate output from each stage of the second counter which is in phase with a respective additional clock phase, and the multiplier provides polyphase outputs having individual controlled binary rates.

17. A converter according to claim 17, wherein each of the additional gates has an extra input terminal so that they can be used also as pulse rate selection gates for the appropriate phase combined output.

18. A frequency to digital converter according to claim 1, wherein the circuits elements used in the multiplier consist of resistors, semiconducting diodes and transistors.